United States Patent [19]

Collins

[11] Patent Number: 4,632,167
[45] Date of Patent: Dec. 30, 1986

[54] LOWER BEAD BREAKER STROKE CONTROL APPARATUS

[75] Inventor: Curran N. Collins, Goshen, Ohio

[73] Assignee: Big Four Equipment, Inc., Maineville, Ohio

[21] Appl. No.: 721,300

[22] Filed: Apr. 9, 1985

[51] Int. Cl.[4] .................................... B60C 25/06
[52] U.S. Cl. .................................... 157/1.28
[58] Field of Search .............. 157/1.17, 1.26, 1.28

[56] References Cited

U.S. PATENT DOCUMENTS

| | | |
|---|---|---|
| 2,812,805 | 11/1957 | Athmann . |
| 3,032,095 | 5/1962 | Brosene et al. ................ 157/1.28 |
| 3,064,718 | 11/1962 | Brosene ........................... 157/1.28 |
| 3,255,800 | 6/1966 | Strang et al. . |
| 3,742,999 | 7/1973 | Myers, Jr. . |
| 3,782,442 | 1/1974 | James, Jr. . |
| 3,807,477 | 4/1974 | Curtis . |
| 4,168,733 | 8/1979 | Gwaltney . |
| 4,222,426 | 9/1980 | Brosene ........................... 157/1.28 |
| 4,423,761 | 1/1984 | Wood . |

*Primary Examiner*—James G. Smith
*Attorney, Agent, or Firm*—Wood, Herron & Evans

[57] ABSTRACT

In a tire changing machine, an apparatus is provided for controlling the stroke of the lower bead breaker shoe in breaking a tire bead from the bead seat of a wheel which includes a fluid motor and a pivot arm which cooperate to move the lower shoe from an initial position below and radially outwardly spaced from the wheel and tire, along a radially inward path to a position wherein the lower shoe engages the bead of a tire. A regulator assembly connected to the lower shoe prevents further radial inward, pivotal movement of the lower shoe once contact is made with the tire bead, and thereafter permits only upward movement of the lower shoe along a slight angle to the vertical so that it follows the profile of the wheel, without contacting the wheel, for completing the bead breaking operation.

9 Claims, 5 Drawing Figures

LOWER BEAD BREAKER STROKE CONTROL APPARATUS

BACKGROUND OF THE INVENTION

This invention relates to power tire changing machines, and, more particularly, to an apparatus for controlling the stroke of a lower bead breaker shoe during the demounting operation of a tire from a wheel.

The majority of tires used on passenger cars and light trucks are of the tubeless type which are mounted on wheels having diameters varying from about 13 to 16 inches depending on the size of the vehicle. Most wheels generally have opposed outer rim flanges and upper and lower tire bead seats adjacent the rim flanges which lead to an inner, annular area usually of the drop center type. Many wheels in use today also include a raised annular safety hump or bead between at least one of the upper and lower bead seats and the annular drop center. Tubeless tires are formed with annular beads at the radially innermost portion of their sidewalls which are adapted to seat within the bead seats of the wheel creating an airtight seal therebetween. If the wheel is provided with one or more safety beads, the tire bead seats between the bead seat and safety bead to lessen the chance of the tire bead separating from the wheel during use.

Tire mounting and demounting machines have been in use several decades for the removal of tubeless tires from wheel rims. In demounting a tire from a wheel, the tire and wheel are first placed on the tire changing machine over a centerpost and then clamped in a horizontal position to the support table of the machine. The outer sidewall of the tire faces upwardly so that the valve core may be removed to enable the air pressure within the tire to drop to about atmospheric level. The upper and lower tire beads must then be broken loose from their respective bead seats adjacent the outer rim flanges of the wheel. Before the development of power tire changing machines, the bead breaking operation was accomplished by hand using chisel-like tools and hammers. Tire mounting and demounting machines now commercially available are power operated and adapted to displace both beads simultaneously or in successive order which greatly simplifies the demounting operation.

Most tire changing machines in commercial use employ an upper bead breaking shoe and a lower bead breaking shoe which are mounted on opposite sides of the tire and moveable toward one another. The upper and lower bead breaking shoes are forced against the tire beads on opposite sides of the tire to push the tire beads off of their seats and toward the inner drop center of the wheel.

In some power tire changing machines, the upper and lower bead breaking shoes move axially and generally parallel to the outer rim flanges of the wheel thereby moving the tire bead along the same path. It has been found, however, that mere axial movement of the tire beads often fails to remove them from their bead seats. If both the upper and lower shoes are advanced only in an axial direction parallel to the rim flanges, the tire is allowed to move radially outwardly from the wheel and both shoes tend to slide radially outwardly from the bead and push only on the sidewalls of the tire. Since the tire's sidewalls are relatively flexible, a force applied there tends to roll the bead on the bead seat area so that upon retraction of the shoes the beads both assume essentially their original position on the bead seats of the wheel.

It was recognized in prior art tire changing machines that the upper and lower bead breaker shoes must not only apply an axial force to the tire but they must also travel as closely as possible to the bead seat of the wheel to avoid sliding radially outwardly from the bead and pushing only on the sidewalls of the tire. One popular design in some tire changing machines was to adjust the radial inward stroke of the lower bead breaker shoe so that it engaged and followed the contour or profile of the wheel to insure contact with the tire bead was maintained. The problem with this approach is that the lower shoe often applied too much pressure to the wheel which frequently resulted in damage. This was particularly true in demounting aluminum and magnesium or "mag" wheels, and sport wheels, which were often scratched, cracked or severely bent. Problems also arose with a safety hump between the bead seat and annular drop center which is incorporated in some wheels to resist unseating of the tire bead during use. In bearing against and closely following the profile of the wheel, the bead breaker shoes of prior tire changing machines often hung up on the safety hump leading to damage of the rim and/or lower shoe. No provision was made in prior art tire changing machines to adjust the pressure applied to the wheel by the bead breaking shoe or control its radial inward movement once contact with the wheel was made.

To avoid damage to the wheels, and particularly mag and sport wheels, some prior art machines provided for the placement of the lower bead breaker shoe over the outer wheel flange prior to the demounting operation. Although this protected the rim flange, the stroke of the lower bead breaker shoe was not adjustable to prevent it from applying excessive pressure to the tire bead seat, safety hump or annular drop center. These portions of the wheel were still subject to damage.

Another attempt to protect wheels from damage was the provision in some prior art machines of a lock-out mechanism for the lower bead breaker shoe. The operator had an option to lock-out or prevent operation of the lower shoe and use the upper bead breaking shoe exclusively. The problem with this approach is that the tire and wheel first have to be mounted on the tire changing machine, the upper bead broken and then the tire turned over to break the lower bead in a separate operation. This is a time consuming and inefficient method of mounting and demounting a tire.

SUMMARY OF THE INVENTION

It is therefore among the objects of this invention to provide an apparatus for controlling the stroke of a lower bead breaker shoe in a power tire changing machine which effectively removes the tire beads from their seat on the wheel without contacting it so that the wheel is not damaged, which is adjustable to accommodate wheels of different diameter and which is adapted to lock out the operation of the lower bead breaker shoe.

These objectives are accomplished in a tire changing machine having an apparatus according to this invention for controlling the stroke of the lower bead breaker shoe which includes a pivot arm connected to the lower bead breaker shoe which is adapted to guide the lower shoe from an initial position below and radially spaced from a wheel mounted upon the tire changing machine, along a radially inward path to a position wherein the lower shoe is positioned immediately adjacent but not in contact with the bead seat of the wheel. A regulator assembly connected to the lower bead breaker shoe prevents further radial inward, pivotal movement of the lower shoe once it is positioned adjacent the wheel, and thereafter permits upward motion of the lower shoe at an angle of about 15° from vertical so that the lower shoe follows the contour or profile of the wheel. The apparatus of this invention therefore guides the lower bead breaker shoe into engagement with the tire bead, and maintains the lower shoe thereagainst, without applying radial inward pressure against the wheel which could damage it.

More specifically, the apparatus of this invention is adapted to control the stroke of a lower bead breaker shoe which is preferably formed in a C-shape with an upper tire engaging end, an arcuate middle portion and a lower end. The arcuate middle portion of the lower bead breaker shoe is connected to the piston of a fluid motor, such as a pneumatic cylinder, which is operable to advance the lower shoe upwardly toward the bead of a tire mounted on the horizontal platform of the tire changing machine. The upper end of the lower shoe is guided into engagement with the lower tire bead and immediately adjacent the wheel by a pivot arm. The pivot arm is mounted at one end to the arcuate middle portion of the lower shoe, spaced from the piston of the pneumatic cylinder, and is pivotally connected at its opposite end to the housing of the tire changing machine. As the lower shoe is moved upwardly by the piston of the pneumatic cylinder, the lower shoe pivots radially inwardly about its pin connection to the pivot arm, and is also guided toward the tire bead by the pivot arm as it pivots about its connection to the machine housing. The pivot arm and pneumatic cylinder thus cooperate to pivot the upper end of the lower shoe over the outer flange of the wheel and guide it radially inwardly into engagement with the lower bead of the tire.

In order to prevent the lower shoe from contacting and damaging the wheel, a regulator assembly according to this invention prevents further radial inward, pivotal motion of the lower shoe once its upper end is positioned immediately adjacent the wheel while permitting continued upward movement of the shoe along the profile of the wheel for completion of the bead breaking operation. The regulator assembly comprises a regulator arm connected at one end to the lower end of the lower shoe and having an elongated slot at its opposite end. A regulator plate is mounted to the tire changing machine and is formed with an angled surface having a plurality of spaced notches therealong. The regulator arm is operatively connected to the regulator plate by an adjustment arm having a pin at one end which is adapted to seat within the notches of the regulator plate and is slidable along the slot formed at the end of the regulator arm. The pin of the adjustment arm is movable to any of the slots formed in the regulator plate to adjust the position of the regulator arm relative to the regulator plate.

As the lower bead breaker shoe moves upwardly and its upper end pivots radially inwardly toward the wheel by operation of the pneumatic cylinder and pivot arm, the regulator arm connected to the lower end of the lower shoe is pivoted in the opposite direction toward the regulator plate. The pin of the adjustment arm slides within the slot formed within the regulator arm, and then seats against the end of the slot which prevents further movement of the regulator arm toward the regulator plate. Once the regulator arm seats against the pin, further pivotal movement of the lower shoe about its pin connection to the pivot arm is locked out. The upper end of the lower shoe thereafter moves upwardly with the piston of the pneumatic cylinder at a slight angle to the vertical, preferably about 15°, so that the lower shoe closely follows the contour of the wheel without contacting it.

The regulator assembly accommodates wheels of different diameter by controlling the extent which the upper end of the lower shoe is permitted to pivot about the pivot arm toward the wheel. This is accomplished by positioning the regulator arm at different notches along the regulator plate using the adjustment arm. The regulator plate is mounted within the machine housing so that the notches in its angled surface are positioned at different distances from the lower shoe. When the regulator arm is positioned at the notch closest to the lower shoe, the regulator arm moves a short distance when pivoted by the lower shoe before the pivotal motion of the lower shoe about the pivot arm is locked out, as described above. This position would be appropriate for large diameter wheels, such as 16 inch wheels. In contrast, to accommodate 13 inch wheels the lower shoe must be permitted to rotate to a greater extent so that its upper end moves radially inwardly immediately adjacent the smaller diameter wheel. Accordingly, the regulator arm is positioned in the notch of the regulator plate which is spaced furthest from the lower shoe to permit maximum movement of the regulator arm before the pin of the adjustment arm seats against the end of its slot.

DESCRIPTION OF THE DRAWINGS

The structure, operation and advantages of a presently preferred embodiment of this invention will become further apparent upon consideration of the following drawings taken in conjunction with the accompanying description, wherein.

DETAILED DESCRIPTION OF THE INVENTION

Figure 1:
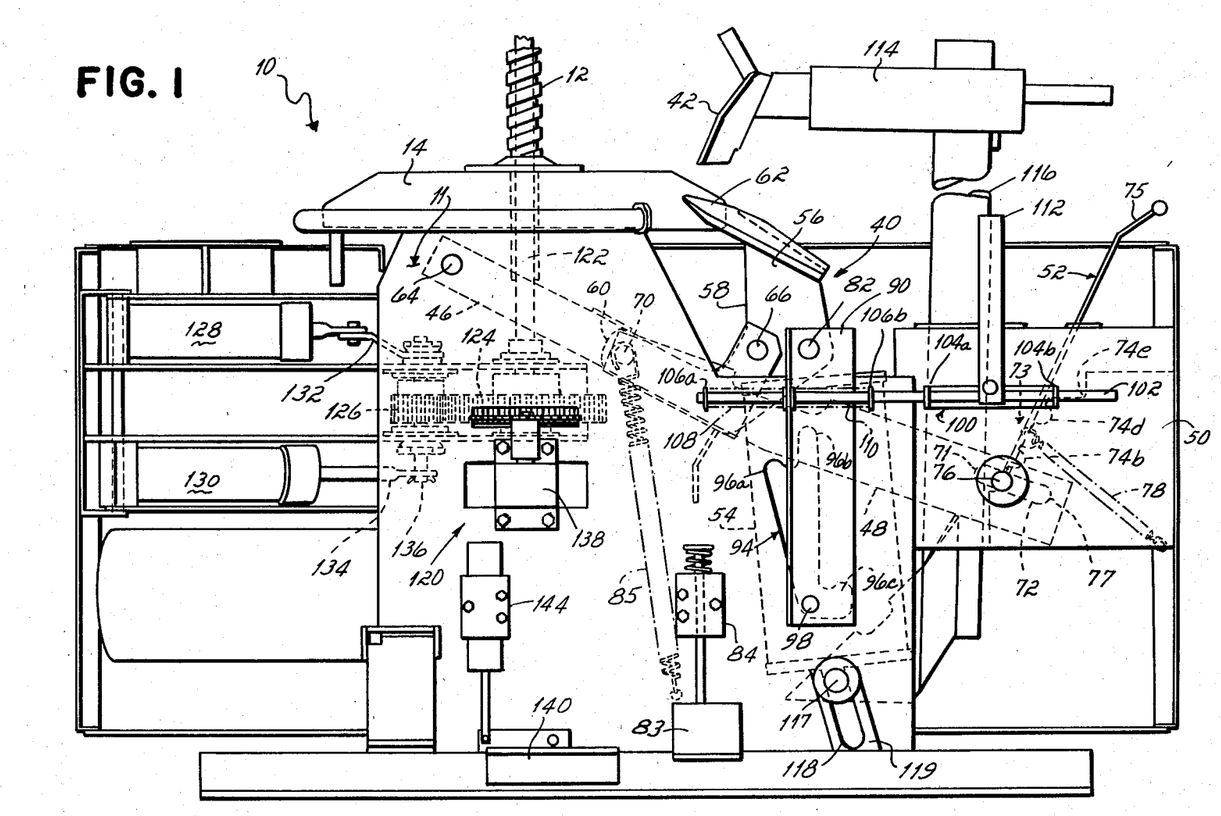
FIG. 1 is a front view of a tire changing machine which is partially broken away to illustrate the apparatus for controlling the stroke of the lower bead breaker shoe according to this invention.
Figure 2:
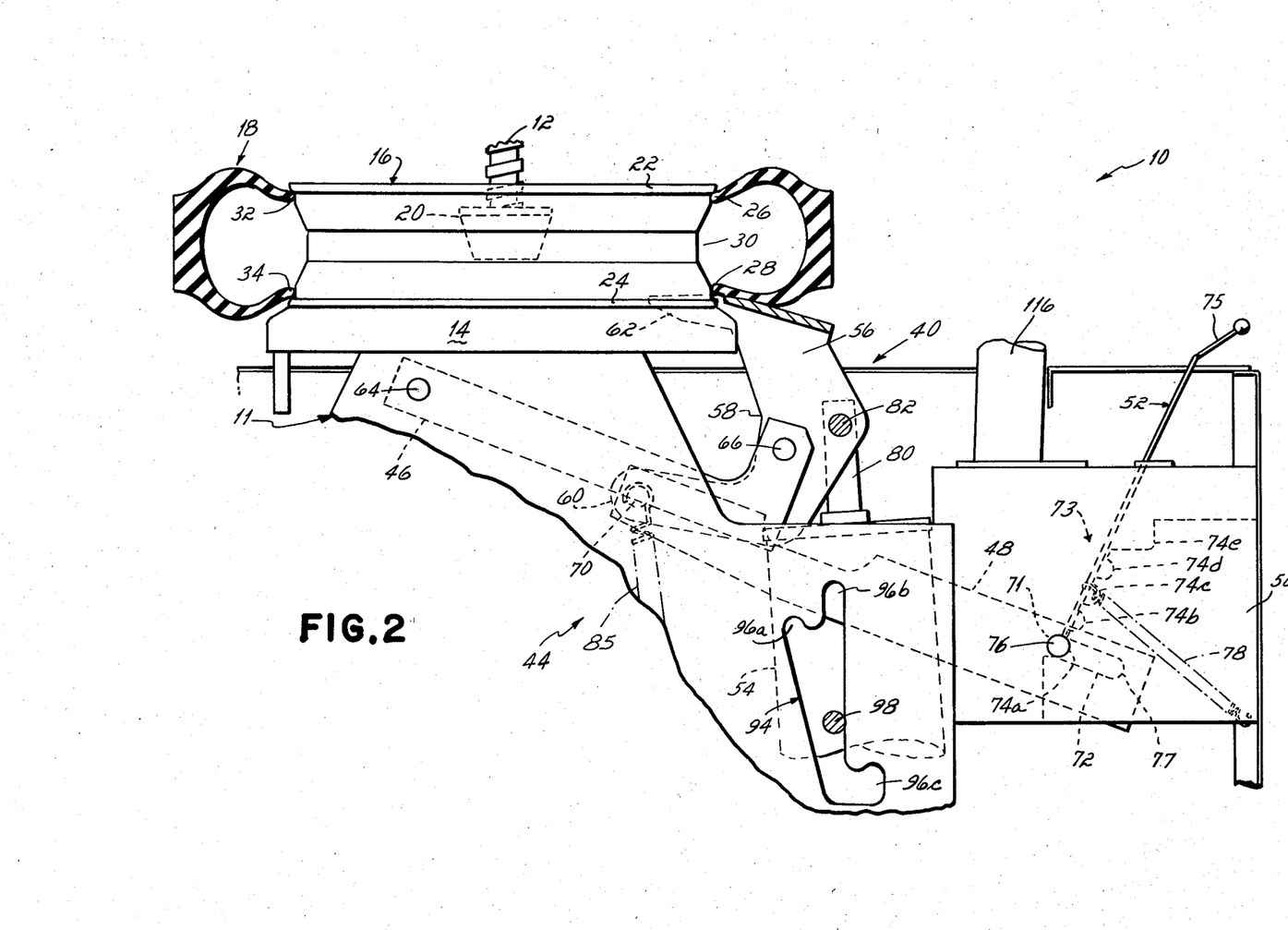
FIG. 2 is a schematic front view of the stroke control apparatus herein at the point of engagement of the lower shoe with the bead of the tire.

Referring to FIGS. 1 and 2, a schematic view of a power tire changing machine 10 is illustrated. The machine 10 includes a rotatable centerpost 12 which extends through a horizontal platform 14 on which the wheel 16 and tire 18 are mounted for demounting of the tire 18 from the wheel 16. A cone 20 is adapted to thread along the centerpost 12 and into engagement with the wheel 16 to secure the wheel 16 and tire 18 in place on the platform 14. The wheel 16 includes an upper flange 22, a lower flange 24, upper and lower tire bead seats 26, 28 disposed immediately adjacent the upper and lower flanges 22, 24, respectively, and an innermost annular area 30. The tire 18 is formed with upper and lower beads 32, 34 which are adapted to seat upon the upper and lower bead seats 26, 28, respectively, of the wheel 16.

In order to remove the tire 18 from the wheel 16, the upper and lower beads 32, 34 of the tire 18 must first be pushed inwardly away from their bead seats 26, 28, respectively, and toward the annular area 30 of the wheel 16. Once the tire beads 32, 34 are unseated, a conventional prying tool (not shown) is mounted to the top of centerpost 12 and extends between the upper flange 22 of wheel 16 and the upper tire bead 32. Upon rotation of the centerpost 12, as described below, first the upper bead 32 and then the lower bead 34 are forced over the upper flange 22 of wheel 16 so that the tire 18 can be removed from the wheel 16.

Referring now to the right portion of FIG. 1 and to FIG. 2, a bead breaking apparatus for demounting tire 18 from wheels 16 is illustrated. The upper and lower tire beads 32, 34 are unseated from the bead seats 26, 28 in wheel 16 by a lower bead breaker shoe 40 and an upper bead breaker shoe 42. In accordance with an objective of this invention, the path along which the lower shoe 40 travels in engaging the lower tire bead 34 and wheel 16, and moving lower tire bead 34 toward the annular area 30 of wheel 16, is carefully controlled to avoid damage to the wheel 16 while effectively breaking the lower tire bead 34 from its seat 28. The movement or stroke of lower shoe 40 is controlled by a pivot arm 46 and a regulator assembly 44 which includes a regulator arm 48, a regulator plate 50 and an adjustment bar 52. As described below, the elements of regulator assembly 44 cooperate with a fluid motor such as a pneumatic cylinder 54 and pivot arm 46 to guide the lower shoe 40 over the lower flange 24 of wheel 16 into engagement with the lower tire bead 34, and then along but not in contact with the lower flange 24 of wheel 16 into the annular area 30 of wheel 16.

As shown in the drawings, the lower shoe 40 is generally C-shaped having an upper end 56, an arcuate middle portion 58 and a lower end portion 60. A yoke 62 is mounted to the upper end 56 of lower shoe 40 and is adapted to engage the lower bead 34 of tire 18.

The pivot arm 46 is pivotally mounted at one end by a pin 64 to the frame 11 of tire changing machine 10. The opposite end of pivot arm 46 is connected by a pin 66 to the lower shoe 40 at one side of its arcuate middle portion 58. As discussed in more detail below, the pivot arm 46 is pivoted about pin 64 so that its opposite end, and, in turn, lower shoe 40, are movable along an arcuate path toward the wheel 18.

The regulator arm 48 is connected at one end by a pin 70 to the lower end portion 60 of lower shoe 40, and its opposite end is formed with an elongated slot 72. The regulator arm 48 extends between the lower shoe 40 and regulator plate 50 which is formed with an angled front surface 73 having a plurality of spaced notches 74a-e. The regulator arm 48 is movable along the side of regulator plate 50 so that its slot 72 may be aligned with any of the notches 74a-e in the regulator plate 50.

The regulator arm 48 is operatively connected to regulator plate 50 by the adjustment arm 52 which includes a handle 75 at its upper end and a pin 76 at its lower end. The pin 76 is adapted to seat within each of the notches 74a-e of regulator plate 50 where it is held in place by a retention spring 78. The adjustment arm pin 76 extends through the slot 72 in regulator arm 48 and is slidable therealong.

Figure 3:
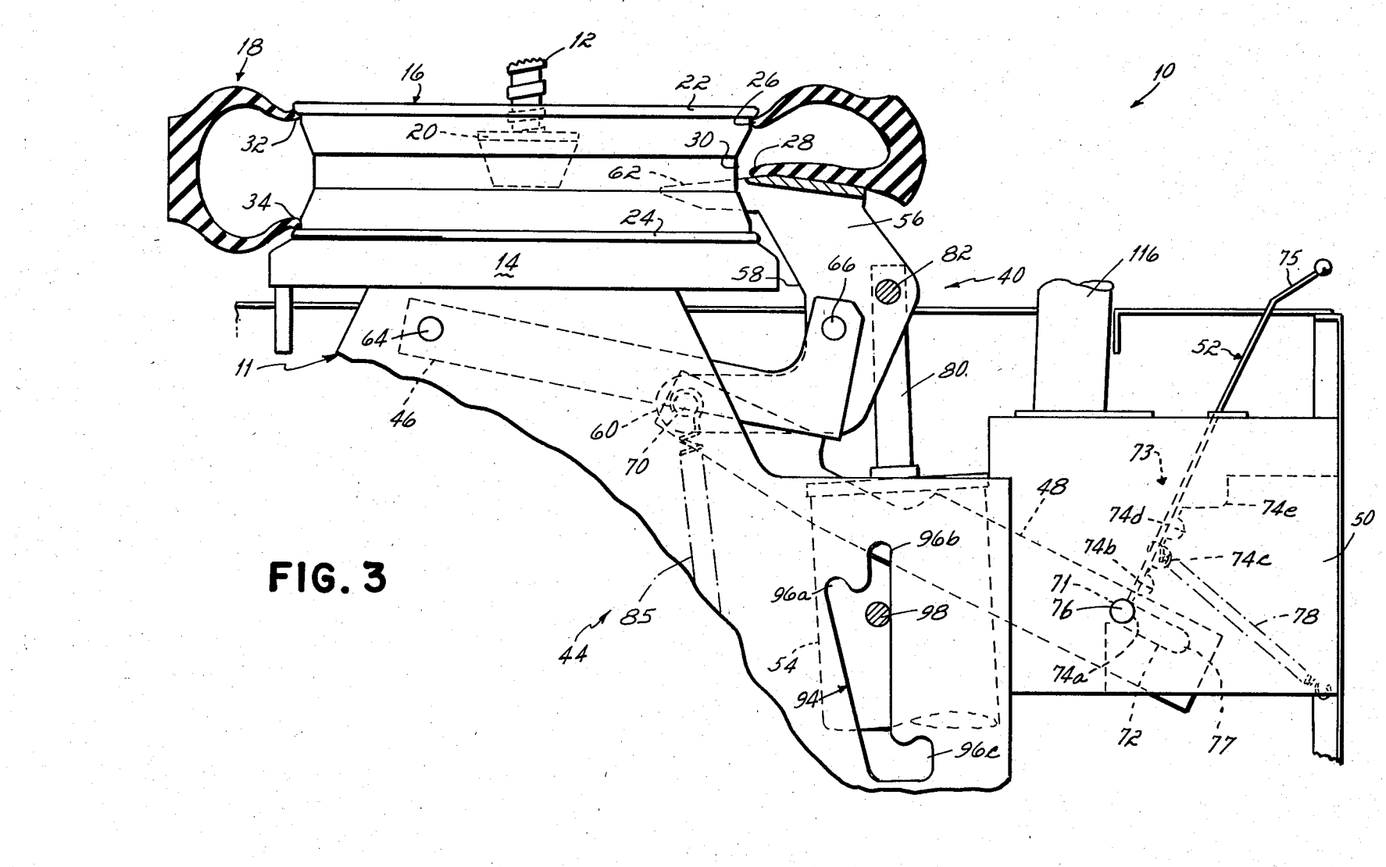
FIG. 3 is a view similar to FIG. 2 in which radial inward movement of the lower shoe about the pivot arm is locked out and the lower shoe is advanced by the pneumatic cylinder to a position where the lower bead of the tire is broken from its seat on the wheel.

The operation of regulator assembly 44 in controlling and guiding the path of lower shoe 40 for breaking the lower bead 34 of tire 18 from the lower bead seat 28 of wheel 16 having a 16 inch diameter is illustrated in FIGS. 1-3. Initially, the regulator arm 52 is manipulated so that its pin 76 seats within the lowermost notch 74a in the front surface 73 of regulator plate 50. In this position, the pin 76 is disposed within the slot 72 in the regulator arm 48 near the forward end 71 of the slot 72. The lowermost notch 74a is closest to the lower shoe 40 and thus accommodates a large diameter tire 18 as more fully explained herein below.

Once the regulator arm 52 is in position with its pin 76 seated in notch 74a, the lower shoe 40 is driven upwardly by the pneumatic cylinder 54. Pneumatic cylinder 54 includes a piston 80 which is connected by a pin 82 to the arcuate middle portion 58 of lower shoe 40, to the right of pivot arm pin 66 as viewed in the figures. Pneumatic cylinder 54 is conventionally activated by depressing a foot pedal 83 which directs pressurized air through a valve 84 operatively connected to the cylinder 54. As the piston 80 pushes the lower shoe 40 upwardly, it pivots the lower shoe 40 in a counterclockwise direction about the pivot arm pin 66. At the same time, the lower shoe 40 is guided toward the lower tire bead 34 by the pivot arm 46 as it pivots about pin 64. The piston 80 and pivot arm 46 therefore combine to guide the upper end 56 of lower shoe 40 over the lower flange 24 of wheel 16 and into engagement with the lower tire bead 34 and immediately adjacent the bead seat 28 of wheel 16. As the upper end 56 of lower shoe 40 pivots radially inwardly toward the lower tire bead 34, the lower end 60 of lower shoe 40 also pivots in a counterclockwise direction which moves the regulator arm 48 laterally toward regulator plate 50. The movement of regulator arm 48 toward regulator plate 50 causes the pin 76 of adjustment arm 52 to slide along the slot 72 in regulator arm 48 and then engage its forward end 71. See FIG. 2.

When seated against the adjustment arm pin 76, the regulator arm 48 prevents further counterclockwise pivotal motion of the lower shoe 40 about the pivot arm pin 66. Therefore, the yoke 62 mounted to the upper end 56 of lower shoe 40 is prevented at this point from pivoting radially inwardly relative to wheel 16. With the regulator arm 48 seated against the adjustment arm pin 76, further movement of the lower shoe 40 is limited to upward movement with the piston 80. Preferably, the piston 80 moves the lower shoe 40 upwardly at approximately a 15° angle to the vertical or longitudinal axis of the wheel 16, so that the lower shoe 40 closely follows the contour of the wheel 16 without contacting it. As shown in FIG. 3, the yoke 62 slides immediately adjacent the contour of wheel 16 with the regulator arm 48 in its seated position so that the lower tire bead 34 is advanced upwardly into the annular area 30 of the wheel 16.

A tension spring 85 is mounted to the lower shoe 40 at pin 70 to help pivot the lower end 60 of lower shoe 40 in a counterclockwise direction, which, in turn, tends to urge the yoke 62 against the tire 18. As explained above, the major force rotating the lower shoe 40 in the counterclockwise direction is provided by the piston 80 which pivots the lower shoe 40 about pin 66. This arrangement prevents the yoke 62 from moving radially outwardly from the lower tire bead 34 toward the sidewall of tire 18 but does not result in the exertion of any pressure which could scratch or bend the wheel 16 because of the restriction to further radially inward, pivotal movement caused by regulator assembly 44.

Figure 4:
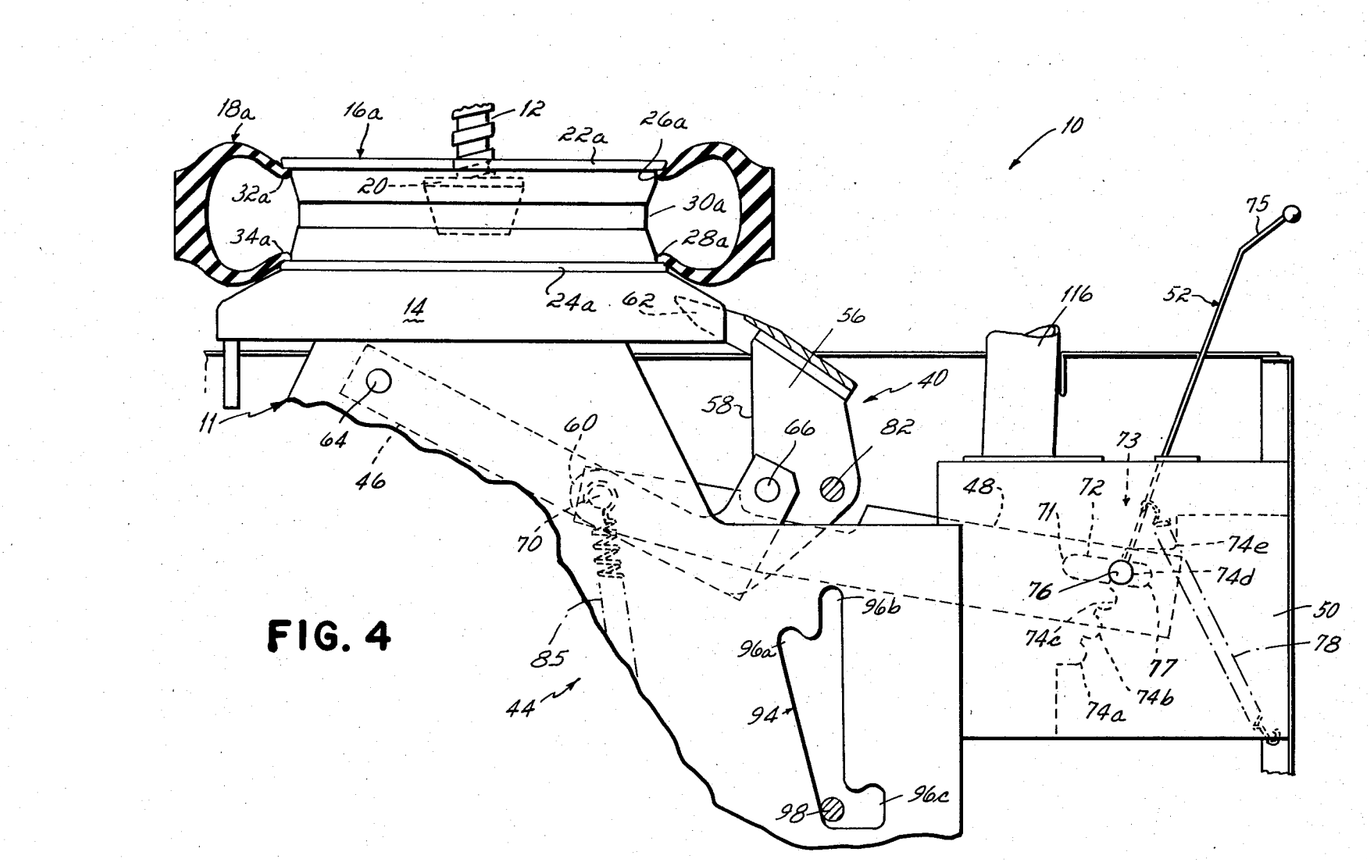
FIG. 4 is a schematic view similar to FIG. 1 of the stroke control assembly of this invention which is adjusted for a smaller rim size than in FIG. 1.
Figure 5:
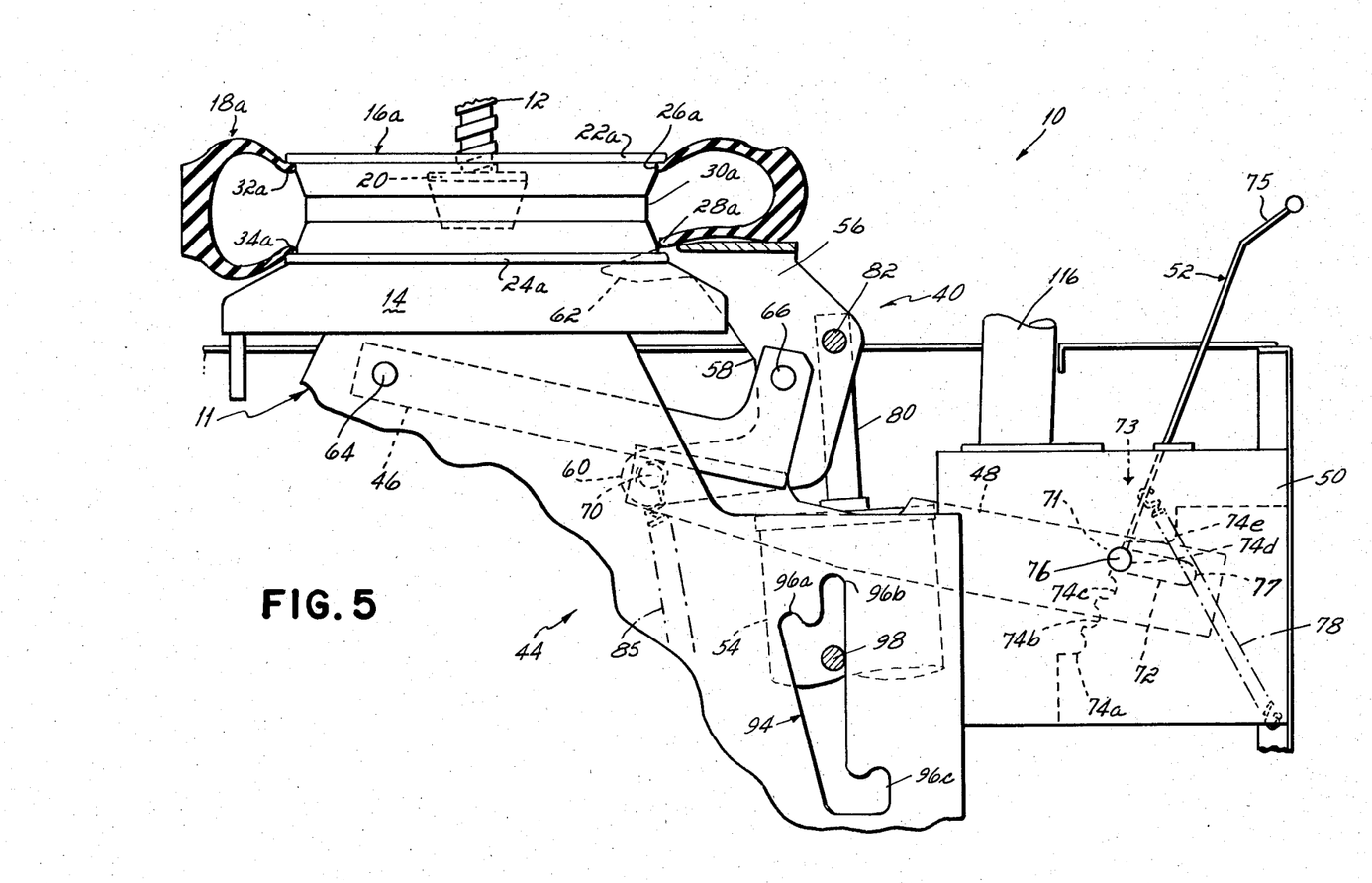
FIG. 5 is the stroke control assembly shown in FIG. 4 with the lower shoe initially contacting the bead of a tire.

Referring now to FIGS. 4 and 5, the regulator assembly 44 of this invention is adjusted to accommodate a wheel 16a having a 13 inch diameter. This is accomplished by pulling upwardly on the adjustment arm 73 so that its pin 76 seats within the notch 74d near the top of the angled front surface 73 of regulator plate 50. In this position, the pin 76 is spaced further away from the lower shoe 40, and is disposed nearer the rearward end 77 of the slot 72 in regulator arm 48, as compared to the position of pin 76 in FIGS. 1-3 wherein a 16 inch diameter wheel 16 is accommodated.

The operation of regulator assembly 44 described above in reference to FIGS. 1-3 is identical in FIGS. 4 and 5, except that the regulator arm 48 is permitted to travel a greater lateral distance toward regulator plate 50 with the counterclockwise pivotal motion of lower shoe 40 about pin 66 before its forward end 71 seats against the pin 76, than was permitted in demounting tire 18 from a 16 inch wheel 16. The yoke 62 of lower shoe 40 thus moves a further distance radially inwardly from its initial, rest position, shown in FIG. 4, to the point engagement with the lower tire bead 34a as shown in FIG. 5 to accommodate the smaller diameter wheel 16a. The position of notch 74d relative to the lower shoe 40 is predetermined to permit radial inward motion of the yoke 62 of lower shoe 40 to the bead seat 28a of a 13 inch wheel 16a. At that point, regulator arm 48 prevents further counterclockwise pivotal motion of the lower end 60 of lower shoe 40 so that the motion of lower shoe 40 is limited to vertically upward motion along the profile of wheel 16a.

Notches 74b and 74c formed in the front surface 73 of regulator plate 50 are provided to accommodate wheels of 14 and 15 inch diameters, respectively. The uppermost notch 74e is a "universal" position which accommodates wheels 16 of every diameter. It is contemplated that the pin 76 would be placed in the universal position at notch 74e when demounting tires 18 from heavy duty wheels 16 where at least some pressure from lower shoe 40 against the wheel 16 would not result in damage. Preferably, the pin 76 would be placed in the appropriate notch 74a-d in demounting tires 18 from most types of wheels 16, and particularly mag and sport type wheels (not shown).

If desired, the stroke of lower shoe 40 may be further controlled by a lock-out assembly in accordance with this invention. As shown in FIG. 1, the lock-out assembly includes a bracket 90 which is mounted by a pin 82 to the lower shoe 40 and extends downwardly over a slot 94 in housing 11. Preferably, the slot 94 is formed with three lobes 96a-c. A rod 98 is mounted perpendicularly to the bracket 90 and is movable within the slot 94. The position of the lower end of bracket 90 and rod 98 relative to slot 94 is adjusted by a lateral positioner arm 100. Positioner arm 100 includes a horizontal rod 102 supported at one end by eyelets 104a, b mounted to the frame 11. At the opposite end, an outer spring 108 extends along the exterior of rod 102 between a washer 106a and the bracket 90, and an inner spring 110 extends along the rod 102 between a washer 106b and the bracket 90. A handle 112 is mounted to the rod 102 near eyelets 104a, b.

By grasping the handle 112 and moving the rod 102 rearwardly, toward regulator plate 50 as shown in FIG. 1, the bracket 90 is pivoted in that direction which positions rod 98 within the lower lobe 96c of the slot 94. In this position of bracket 90, vertical movement of lower shoe 40 is prevented by the engagement of rod 98 with the frame 11 within the lobe 96c.

By moving the rod 102 of positioner arm 100 forwardly so that the rod 98 mounted to bracket 90 extends within the center of slot 94, normal vertical movement of the lower shoe 40 as described above is permitted. In this position, as the lower shoe 40 moves upwardly, the rod 98 moves along the slot 94 toward lobe 96b as shown in FIGS. 2-5. If desired, the rod 102 of positioner arm 100 may be advanced to its furthest forward position in which the bracket rod 98 is positioned along the forward edge of slot 94 so that it moves upwardly toward the lobe 96a. In this position, vertical upward motion of the lower shoe 40 is limited. It is contemplated that the forwardmost position of horizontal rod 102, causing the bracket rod 98 to seat within lobe 96a, would be preferable for mag and sport wheels to prevent the lower shoe 40 from moving into engagement with the upper portion of the lower bead seat 28.

Referring now to FIG. 1, a conventional upper bead breaker shoe 42 is mounted by a cross brace 114 to a power column 116. The lower end of power column 116 is in turn connected to a rod 117 movable along a slot 118 formed in a pair of opposed flanges 119, only one of which is shown in FIG. 1. The base of pneumatic cylinder 54 rests against the rod 117 so that when actuated to extend piston 80 the pneumatic cylinder 54 presses downwardly against the rod 117 to move the power column 116 and upper shoe 42 downwardly. Therefore, the upper shoe 42 contacts the upper tire bead 32 at the same time, and in the opposite direction, as the force applied to the lower tire bead 34 by the lower shoe 40.

Referring to the left portion of FIG. 1, the centerpost drive assembly 120 is shown which forms no part of this invention but is described briefly herein to aid in an understanding of the removal of tire 18 from wheel 16. The shaft 122 of centerpost 12 extends downwardly from the platform 14 and mounts to a follower gear 124. The follower gear 124 meshes with a main drive gear 126 which is rotated by a pair of pneumatic cylinders 128, 130. Each of the cylinders 128, 130 are operatively connected by crank arms 132, 134, respectively, to a crank shaft 136 upon which the main drive gear 126 is mounted for rotation.

The operation of cylinders 128, 130 is controlled by a spool valve controller 138. For purposes of the present discussion, spool valve controller 138 is operated by depressing a foot treadle 140 which releases pressurized air through valve 144 and into the controller 138. The controller 138 is adapted to sequentially drive the cylinders 128, 130 so as to rotate the main drive gear 126, and, in turn, the follower gear 124 which rotates the centerpost shaft 122. The controller 138 is activated when the upper and lower tire beads 32, 34 have been broken from their seats and a pry tool (not shown) has been inserted over the centerpost shaft 122 and between the tire bead 32 and wheel 16. Rotation of the centerpost shaft 122, as controlled by the controller 138, causes the pry tool to rotate along the circumference of wheel 16 and lift the tire bead 32 over the wheel flange 22 for removal of the tire 18 from the wheel 16. For a detailed discussion of the spool valve controller 138, and remainder of the centerpost drive assembly 120, reference should be made to my co-pending application Ser. No. 721,299 filed Apr. 9, 1985, now U.S. Pat. No. 4,586,551 issued May 5, 1986, and entitled "Centerpost Drive For A Tire Changing Machine", which is incorporated by reference herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In power tire changing machine including a frame carrying a horizontal platform for supporting a wheeel mounting a tire having a lower bead, an apparatus for breaking the lower bead of the tire from the wheel, comprising:

a pivot arm pivotally mounted to the frame of the tire changing machine below the wheel and tire carried by the horizontal platform of the frame;

a lower bead breaker shoe pivotally mounted to said pivot arm, said lower bead breaker shoe having an upper end disposed in an initial position below and radially outwardly spaced from the lower bead of the tire;

fluid motor means connected to said lower bead breaker shoe for moving said lower bead breaker shoe with a combined upward and radially inward motion relative to the tire and wheel so that said upper end of said lower bead breaker shoe engages the lower bead of the tire;

regulator means connected to said lower bead breaker shoe for selectively stopping said radially inward movement of said upper end of said lower bead breaker shoe at a predetermined point spaced from the wheel, while permitting continued upward movement of said upper end of said lower bead breaker shoe against the lower bead of the tire without contacting the wheel to break the lower bead of the tire from the wheel.

2. The apparatus of claim 1 in which said regulator means comprises:

a fixed regulator plate;

a regulator arm connected to said lower bead breaker shoe, said regulator arm extending between said lower bead breaker shoe and said regulator plate;

means operatively connecting said regulator arm to said regulator plate;

said regulator arm being laterally movable toward said regulator plate in response to said radially inward, pivotal movement of said lower bead breaker shoe, said connecting means being adapted to seat along said regulator plate and engage said regulator arm when said regulator arm moves a predetermined distance toward said regulator plate, said connecting means preventing further lateral movement of said regulator arm after said predetermined distance so as to prevent further pivotal movement of said lower bead breaker shoe.

3. The apparatus of claim 2 in which said regulator arm is formed with a slot at one end, said regulator plate being formed with a surface having a plurality of spaced notches, said slotted end of said regulator arm being disposed along said regulator plate and movable so as to align said slot thereof with said notches in said regulator plate, said connecting means including a bar having a pin at one end, said pin being adapted to seat in each of said notches of said regulator plate and being slidable within said slot in said regulator arm, said regulator arm being laterally movable toward said regulator plate in response to said pivotal movement of said lower bead breaker shoe so that said pin slides within said slot of said regulator arm, said pin engaging the end of said slot in said regulator arm to prevent further lateral movement thereof toward said regulator plate after a predetermined amount of lateral movement, said lower bead breaker shoe being thereafter prevented by said regulator arm from further radially inward, pivotal movement relative to the tire bead.

4. The apparatus of claim 3 in which said surface of said regulator plate is angled so that said notches formed in said regulator plate are disposed at different distances from said lower bead breaker shoe, said regulator arm being permitted to move different lateral distances toward said regulator plate with said pin seated in different notches in said regulator plate so as to vary the amount of radial inward movement of said lower bead breaker shoe to accommodate wheels of different diameter.

5. The apparatus of claim 1 in which said lower bead breaker shoe is formed in a C-shape including a lower end, and an arcuate middle portion between said upper end and said lower end, one end of said pivot arm being pivotally connected to said arcuate middle portion of lower bead breaker shoe, and the other end of said pivot arm being pivotally mounted to the tire changing machine.

6. The apparatus of claim 5 in which said fluid motor means includes a piston mounted to said arcuate middle portion of said lower bead breaker shoe offset from said pivot arm, said piston being movable to pivot said lower bead breaker shoe about the connection thereof to said pivot arm.

7. The apparatus of claim 1 in which said lower bead breaker shoe is formed in a C-shape having a lower end, and an arcuate middle portion between said upper end and said lower end, said regulator means including a regulator arm pivotally mounted to said lower end of said lower bead breaker shoe and a regulator plate spaced from said lower bead breaker shoe, said lower bead breaker shoe being pivoted so as to laterally move said regulator arm toward said regulator plate.

8. The apparatus of claim 1 further including a vertical lock-out assembly comprising:

a bracket connected to said lower bead breaker shoe, said bracket being movable upwardly with said lower bead breaker shoe;

a pin mounted to said bracket, said pin being movable within a slot having lobes formed in said tire changing machine;

adjustment means for moving said bracket and said pin relative to said slot, said bracket preventing upward movement of said lower bead breaking shoe upon contact of said pin with one of said lobes of said slot.

9. In a power tire changing machine including a frame carrying a horizontal platform for supporting a wheel mounting a tire having a lower bead, an apparatus for breaking the lower bead of the tire from the wheel, comprising:
- a pivot arm pivotally mounted to the frame of the tire changing machine below the wheel and tire carried by the horizontal platform of the frame;
- a lower bead breaker shoe pivotally mounted to said pivot arm, said lower bead breaker shoe having an upper end disposed in an initial position below and radially outwardly space from the lower bead of the tire;
- fluid motor means connected to said lower bead breaker shoe for moving said lower bead breaker shoe with a combined upward and radially inward motion relative to the tire and wheel so that said upper end of said lower bead breaker shoe engages the lower bead of the tire;
- adjustable regulator means connected to said lower bead breaker shoe for stopping said radially inward movement of said upper end of said lower bead breaker shoe at selected locations relative to the wheel depending upon the diameter of a given wheel so that said upper end of said lower bead breaker shoe is spaced from a wheel of given diameter upon engagement with the lower bead of the tire, while permitting continued upper movement of said upper end of said lower bead breaker shoe against the lower bead of the tire without contacting the wheel to break the lower bead of the tire from the wheel.

* * * * *